Nov. 5, 1968     J. C. GARRETT ETAL     3,408,771
MAGNETIC AISLE CORD
Filed Nov. 25, 1966
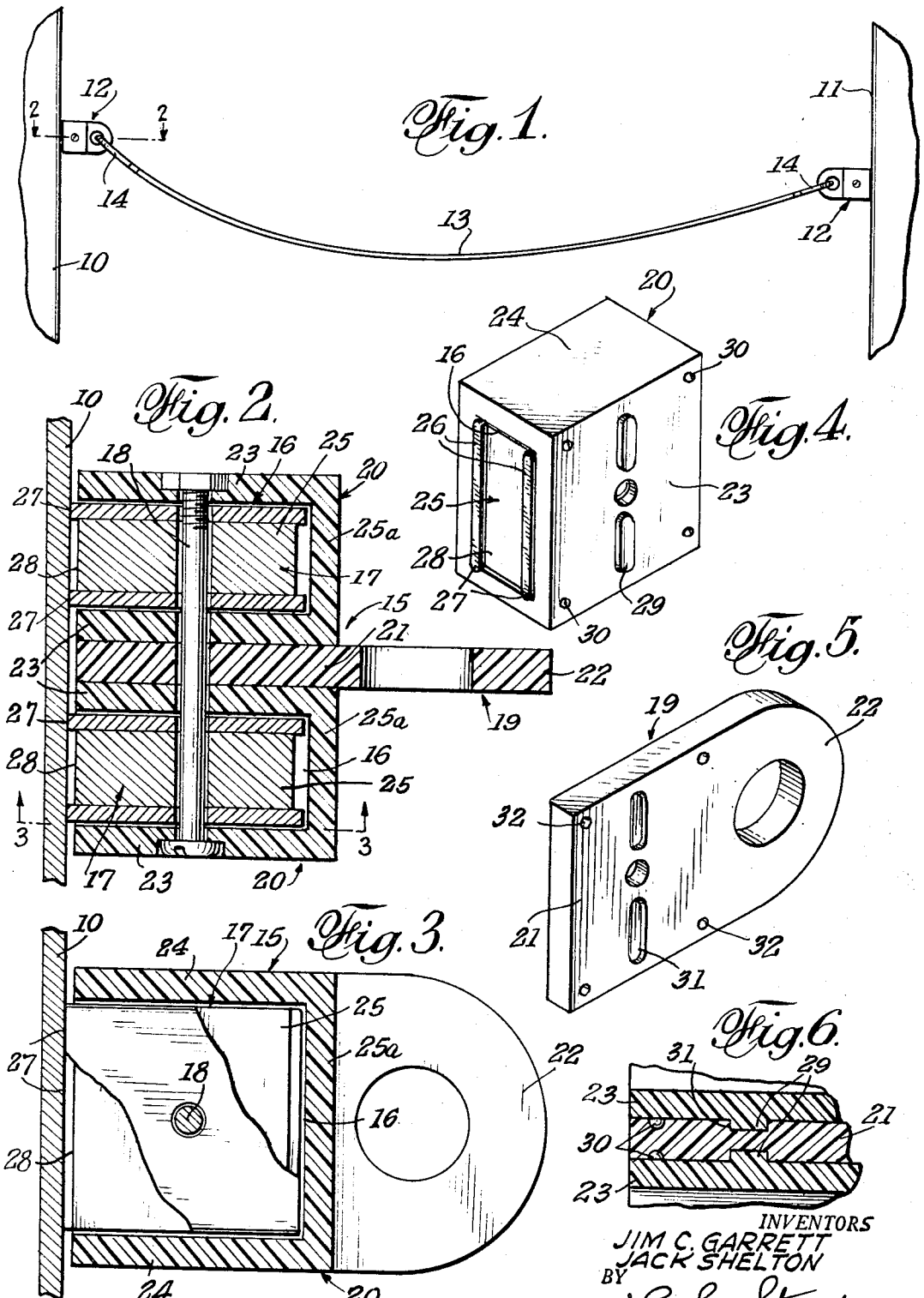
INVENTORS
JIM C. GARRETT
JACK SHELTON
BY
C. G. Stratton
ATTORNEY United States Patent Office 3,408,771
Patented Nov. 5, 1968

3,408,771
MAGNETIC AISLE CORD
Jim C. Garrett, Inglewood, and Jack Shelton, South Pasadena, Calif. (both of 3300 E. Spring St., Long Beach, Calif. 90806)
Filed Nov. 25, 1966, Ser. No. 597,088
4 Claims. (Cl. 49—34)

ABSTRACT OF THE DISCLOSURE

The magnetically mounted cord shown, while adapted for other uses to span between two ferrous members, is more particularly provided for spanning across an aisle for controlling or restricting movement of personnel into and through said aisle. The same constitutes a means either end of which may be detached from one of said members or the other and returned to operative position, merely by placing such detached end near or in contact with the member from which it has been detached. An important feature is that the fitting at each end of the cord is so formed as to magnetically cling to any member formed wholly or partly of iron in a manner to resist lateral pressure, thereby offering great resistance to accidental detachment. Yet the cord remains firmly in place as a warning that the area beyond it is temporarily restricted to access, due to one of several reasons, as cleaning, presence of employees on movable ladders, and like conditions.

Brief summary of the invention

The aisle cord of this invention comprises a flexible member that by means, such as loops on its ends, is provided at each end with a unit or fitting employing permanent magnetic means adapted to be magnetically held by ferrous members on opposite sides of an aisle or other space. Said units are alike, each comprising a high-impact plastic housing and two permanent magnetics in spaced side-by-side relation disposed in said housing. Said magnets are loosely yet non-removably held in the housing so they may accommodate themselves to the ferrous surface to which they are applied, thereby providing firm magnetic attraction between the units and the members to which they are applied. The housings are provided with attaching lugs or ears for loops on the ends of the cord; said lugs or ears are located centrally in the space between the magnet units, thereby providing equality of dislodging force on the two magnets when the cord is pulled. Due to the large size of the base formed by the two magnets, they strongly resist separation from the member to which applied, largely due to the mentioned large size of the magnetic base.

An object of the invention is to provide magnetic units on the ends of a flexible member that strongly resist removal from the surface of a ferrous member, thereby safely retaining their operative position against accidentally applied dislodging forces and yet being readily dislodged from said surfaces.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

Detailed description of the invention

In the drawing, like reference characters designate similar parts in the several views.

FIG. 1 is a side elevational view of the present magnetic aisle cord in a typical operative position.

FIG. 2 is an enlarged cross-sectional view as taken on the line 2—2 of FIG. 1.

FIG. 3 is a cross-sectional view as taken on the line 3—3 of FIG. 2.

FIG. 4 is a perspective view of a component of one of the magnetic units comprising the present aisle cord.

FIG. 5 is a perspective view of another component.

FIG. 6 is a fragmentary sectional view showing a detail of the construction.

The drawing shows two aisle-defining members 10 and 11 ordinarily made of steel and spaced to define an aisle or other space. These members 10 and 11 may comprise upright, horizontal or otherwise disposed portions of shelving cribs, racks and the like, the same ordinarily having flat surfaces.

The present magnetic aisle cord is shown as comprising, generally, two similar units 12 and a flexible cord, cable or the like 13 having loops 14 connected to said units. More than two such units 12 may be provided, two at the ends and one or more intermediate the ends and slidable therealong. Each said unit is adapted for temporary connection with a member 10 or 11.

Each unit 12 comprises, generally, a sectional housing 15 of plastic, such as high-impact styrene or the equal, provided with side-by-side recesses 16 and housing permanent magnetic units 17 held in said recesses by a through bolt 18.

The housing 15 is shown as comprising three plastic components: a component 19 and two similar recessed components 20, one on each side of the component 19, with the bolt 18 extending through all three components and through said recesses 16 to fasten said components fixedly together.

The component 19 is shown as a flat plate 21 with an extending ear or lug portion 22 having a hole therein for one of the loops 14 of the cord 13.

Each component 20 has a parallelopiped form having side walls 23, top and bottom walls 24, and an end wall 25a, the latter defining the bottom of the recess 16 framed by the walls 23 and 24. The mentioned bolt 18 passes through aligned holes in the plate 21 and the sides 23. Thus, the housing 15 has the ear 22 preferably centrally between the outer side walls 23 of the components 20, the recesses 16, thereby, being located on either side of said component 19. The recesses are open on the ends of the components 20 that are opposite to the ear 22.

The magnets 17 are loosely fitted in the recesses 16, the same having holes aligned with the holes in the housing components and through which the bolt 18 extends. The holes in the magnets are larger than the bolt, allowing for limited movement of the magnets in their respective recesses.

Each magnet is shown as comprising a rectangular permanent magnet 25 and rectangular flanking soft iron plates 26, arranged on either side and sandwiching the magnet between them. As best seen in FIG. 2, the plates 26, lengthwise of the recesses 16, are longer than the magnets 25 so the end edges 27 of said plates 26 may extend beyond the open ends of the components 20 and of the end edges 28 of the magnets.

While the magnets 17 are loosely retained in their recesses, the housing components 19 and 20 are retained against relative displacement by interfitting projections 29 and 30 and seats 31 and 32, the latter formed in the opposite faces of the plate 21 and the latter on the sides 23 of the components that are engaged with said opposite faces. When the bolt 18 is tightly applied, the three components become a solid, inarticulate assembly in which the magnets have free, limited movability.

It will be clear that the construction above described allows the edges 27 of plates 26 of the magnets to achieve flatwise contact with the face of a member 10, since the magnets are independently movable. The magnet edges 28 are, thereby, kept from direct contact with said member 10. Also, the two magnets, being spaced apart and on each side of the component that is connected to the cord, provide a wide contact base that engages said member 10 and strongly resists being tipped or tilted, because any pull on the cord is transmitted between the magnets.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the range of the appended claims.

Having thus described the invention, what is claimed and desired to be secured by Letters Patent is:

1. In a space-spanning cord assembly, a unit for temporarily connecting an end of said cord to a surface of a ferrous member, said unit comprising:
    (a) a plastic housing provided with a central portion having an extension for connection to said cord and having transversely spaced recesses open on the end of the housing opposite to said extension, the latter being centered between said recesses,
    (b) two permanent magnet units loosely disposed, one in each said recess and, thereby, located on each side of said central portion and its extension, with an edge of each magnet extending beyond the open end of each respective recess, and
    (c) means to retain the magnet units within their respective recesses so the same are capable of independent and limited movement relative to each other and to the housing.

2. In a space-spanning cord assembly according to claim 1, the plastic housing comprising:
    (a) a separate middle component comprising the mentioned central portion and extension, and
    (b) two similar components having the mentioned recesses therein and in flanking contact with the middle component,
    (c) the magnet unit-retaining means comprising a bolt extending through and fixedly connecting said three components.

3. In a space-spanning cord assembly according to claim 2, the magnet units having aligned holes therein larger than said bolt, and the bolt extending through said holes to limit the mentioned movement of the magnet units.

4. In a space-spanning cord assembly according to claim 2, means comprising interfitting projections and recesses and the contacting faces of the three components of the housing to hold said components non-movable relatively.

References Cited

UNITED STATES PATENTS

| | | | |
|---|---|---|---|
| 1,832,271 | 11/1931 | Williams | 49—34 X |
| 2,392,755 | 1/1946 | Michaels | 49—34 |
| 2,709,245 | 5/1955 | Schneider. | |
| 3,016,563 | 1/1962 | De Jong | 292—251.5 X |
| 3,025,559 | 3/1962 | Basinger | 292—251.5 X |
| 3,041,697 | 7/1962 | Budreck | 24—201.2 |
| 3,201,072 | 8/1965 | Du Bois. | |
| 3,326,587 | 6/1967 | Reiss | 292—251.5 |

DAVID J. WILLIAMOWSKY, *Primary Examiner.*

D. L. TAYLOR, *Assistant Examiner.*